United States Patent [19]

Rich et al.

[11] 4,194,169

[45] Mar. 18, 1980

[54] MOLECULAR LASER OPERATING ON FUNDAMENTAL AND OVERTONE BANDS

[75] Inventors: Joseph W. Rich, East Aurora; Richard C. Bergman, Corfu, both of N.Y.

[73] Assignee: Calspan Corporation, Buffalo, N.Y.

[21] Appl. No.: 854,863

[22] Filed: Nov. 25, 1977

[51] Int. Cl.$^2$ ............................................... H01S 3/00
[52] U.S. Cl. ............................................... 331/94.5 G
[58] Field of Search ...................... 331/94.5 G, 94.5 P, 331/94.5 PE, 94.5 C

[56] References Cited

U.S. PATENT DOCUMENTS

| | | | |
|---|---|---|---|
| 3,811,095 | 5/1974 | Rich et al. .................. | 331/94.5 PE |
| 4,132,961 | 1/1979 | Bergman .................... | 331/94.5 PE |

OTHER PUBLICATIONS

J. W. Rich et al., "Electrically Excited, Supersonic Flow Carbon Monoxide Laser," *AIAA Journal*, vol. 13, No. 1, Jan. 1975, pp. 95–101.

W. B. Roh et al., "CO Laser Spectra," *Journal of Molecular Spectroscopy*, 49, 1974, pp. 317–321.

F. G. Sadie et al., "Continuous-Wave Overtone Bands in a $CS_2$-$O_2$ Chemical Laser," *J. Appl. Phys.*, vol. 43, No. 6, Jun. 1972.

*Primary Examiner*—James W. Davie
*Attorney, Agent, or Firm*—Allen J. Jaffe; David J. Zobkiw

[57] ABSTRACT

Laser output from the fundamental, first overtone, and second overtone transitions in CO is achieved in a supersonic flow laser using an electric-discharge-excited CO/He/$O_2$ mixture.

15 Claims, 5 Drawing Figures

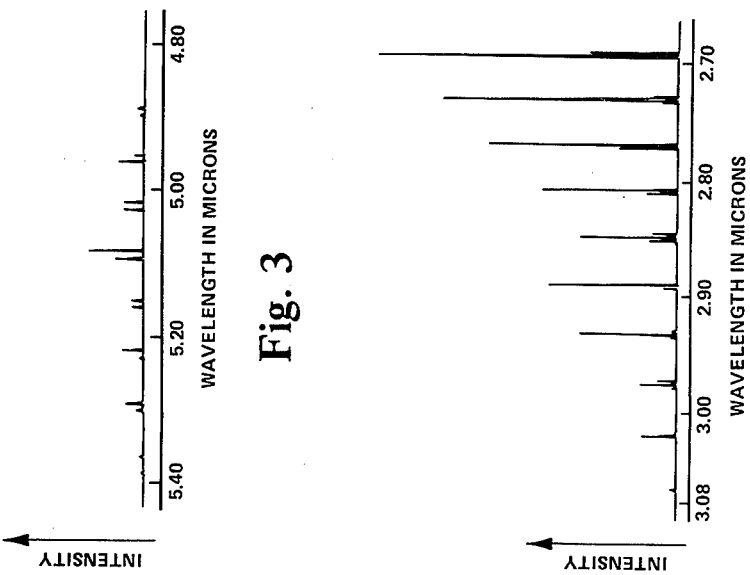
Fig. 3
Fig. 4
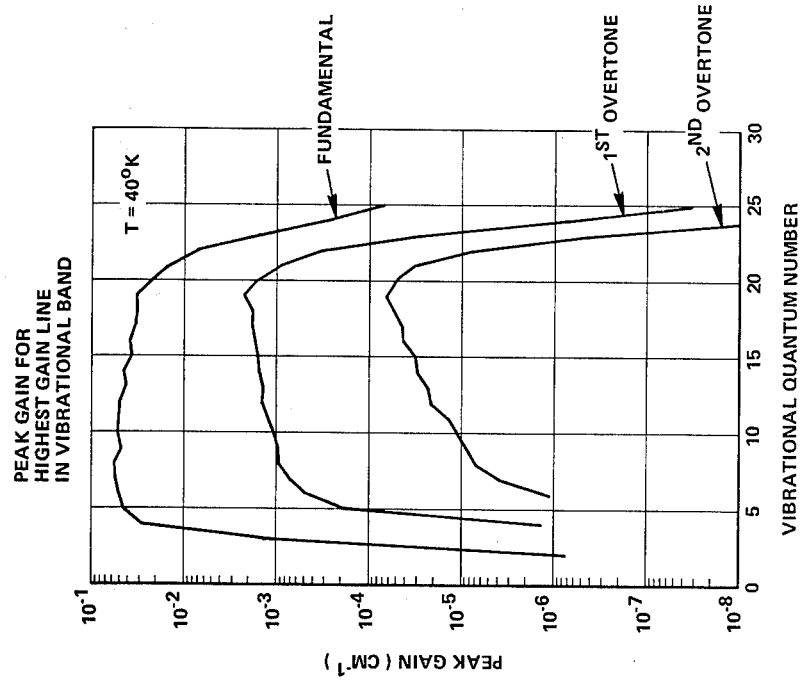
Fig. 5

MOLECULAR LASER OPERATING ON FUNDAMENTAL AND OVERTONE BANDS

The invention herein described was made in the course of or under a contract with the U.S. Air Force.

In many high power infrared laser applications, such as optical communications, laser isotope separation processes and laser controlled chemical reactions, the utility of the laser source increases as the wavelength range and number of lasing lines increases. The ultimate laser source is one that is completely turnable over a broad wavelength range with high output power. Electric-discharge-excited CO lasers, using supersonic gas flow to obtain low in-cavity temperatures, can produce cw powers in the kilowatt range, with output distributed over many vibration-rotation lines of the fundamental ($\Delta V=1$) infrared bands of CO. The supersonic CO laser which is the subject matter of commonly assigned U.S. Pat. No. 3,811,095 has high output power over approximately 40 lines in the 4.8$\mu$ to 5.8$\mu$ wavelength range corresponding to the fundamental vibration-rotation transitions in CO.

It is an object of this invention to provide a method and apparatus for obtaining laser output from the fundamental, first overtone, and second overtone transitions in CO. This object, and others as will become apparent hereinafter, is accomplished by the present invention.

The present invention consists of three sections. The first section is an electrically excited gas discharge section which processes a flowing mixture containing CO and which is described in detail in commonly assigned U.S. Patent Application Ser. No. 783,111 filed Mar. 31, 1977 and now U.S. Pat. No. 4,132,961. The second section is a supersonic expansion which gas dynamically cools the flowing gas mixture to a chosen kinetic temperature which is Mach number dependent and which is described in detail in U.S. Pat. No. 3,811,095. The third section is the laser power extraction section consisting of three sets of mirrors and a constant temperature flow field.

BRIEF DESCRIPTION OF THE DRAWINGS

For a fuller understanding of the present invention, reference should now be had to the following detailed description thereof taken in conjunction with the accompanying drawings wherein:

FIG. 3 is an experimental recording of the laser output spectra for the fundamental, $\Delta V=1$, spectrum;

FIG. 4 is an experimental recording of the laser output spectra for the first overtone, $\Delta V=2$, spectrum; and FIG. 5 is a theoretical plot of the peak gain for the highest gain line in a given vibrational band vs. that given band's vibrational quantum number for $\Delta V=1, 2,$ and 3 transitions in CO.

DESCRIPTION OF THE PREFERRED EMBODIMENT

Figure 1:
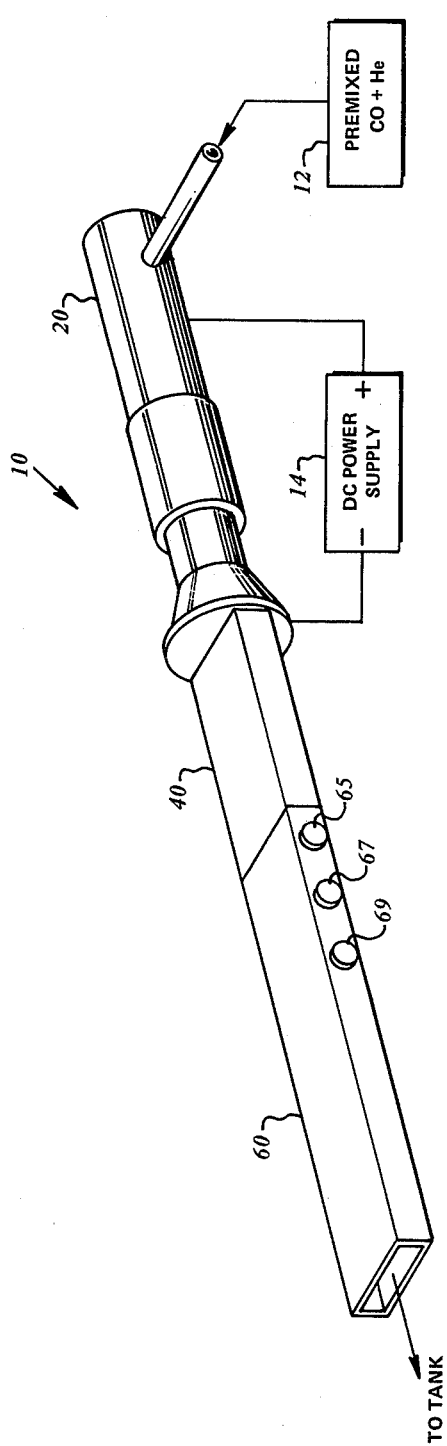
FIG. 1 is a pictorial view of the apparatus.
Figure 2:
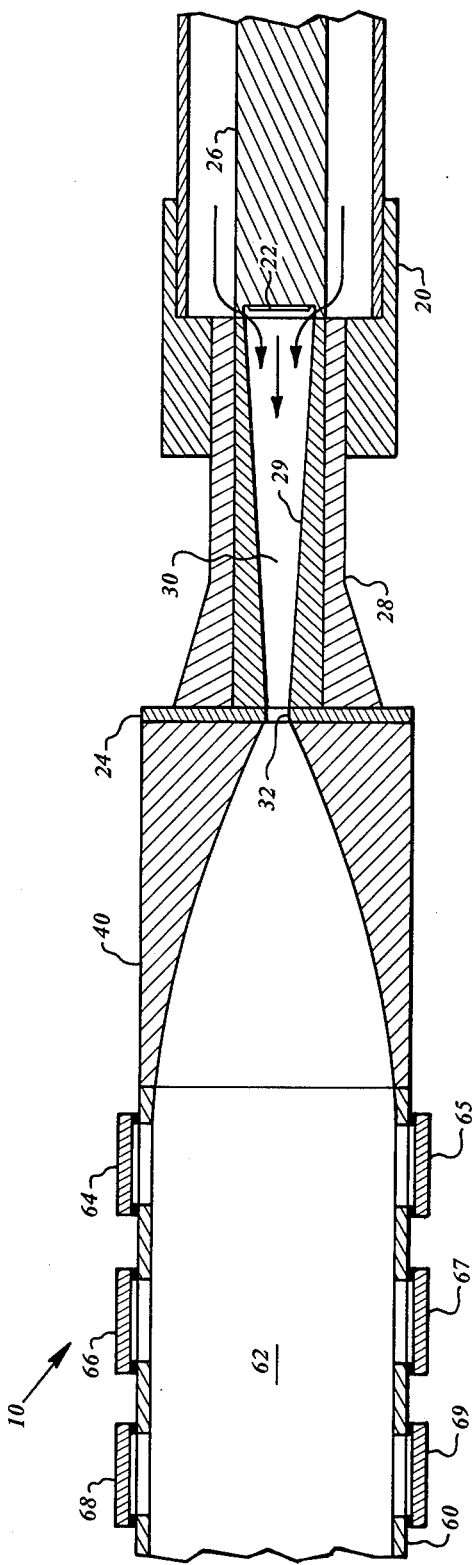
FIG. 2 is a partial sectional view of the apparatus.

As is best shown in FIG. 1, the laser which is generally designated by the numeral 10 consists of three sections designated 20, 40 and 60, respectively. The first section, 20, is the electrically excited gas discharge section which processes a flowing gas mixture containing CO supplied from lasant gas supply 12 and is operatively connected to a DC power supply 14. Through electron energy transfer the CO becomes vibrationally excited. Discharge section 20 is the subject matter of U.S. Patent Application Ser. No. 783,111, now U.S. Pat. No. 4,132,961, and, as best shown in FIG. 2, includes injection discharge anode 22 and discharge cathode 24. Anode 22 is formed by imbedding two copper wires in a Plexiglas or glass rod 26 which is provided with lips to produce gaps when positioned against discharge section 28. This places the wires forming anode 22 within a region of sonic gas flow. Discharge section 28 includes a liner 29 which defines a tapering rectangular passageway 30 which provides a smooth transition from anode 22 to expansion throat 32 defined by cathode 24. Passageway 30 tapers down to a cross sectional area slightly larger than expansion throat 32.

The second section, 40, is a supersonic expansion section which gas dynamically cools the flowing gas mixture to a chosen kinetic temperature which is Mach number dependent. Supersonic expansion section 40 is the subject matter of U.S. Pat. No. 3,811,095.

The third section, 60, is the laser power extraction section consisting of three sets of mirrors and a constant temperature flow field. Each set of mirrors forms a laser cavity distinct from the other two sets with one mirror a total reflector and the other a partial reflector. The optical cavity 62 has an axis transverse to the flow direction and is downstream of throat 32. Internal mirror pairs 64 and 65, 66 and 67, and 68 and 69 form laser cavities for extracting second overtone, first overtone and fundamental laser power, respectively. Mirrors 64, 66 and 68 are total reflectors and output mirrors 65, 67 and 69 are partial reflectors. Second overtone output mirror 65 is a dielectric-coated flat, providing approximately 0.5% transmission and 99.5% reflectivity over a 1.7 to 2.8 micron band pass and is coated to have minimum reflectivity in the 2.35 to 4.5 and 4.8 to 5.8 micron band passes of the CO first overtone and CO fundamental bands. First overtone output mirror 67 is a dielectric-coated flat, providing approximately 1% transmission and 99% reflectivity over a 2.35 to 4.5 micron band pass and is coated to have approximately 30% or less reflectivity in the 4.8 to 5.8 micron band pass of the CO fundamental. Fundamental output mirror 69 is a dielectric coated flat, providing approximately 25% transmission and 75% reflectivity over a 4.8 to 5.8 micron band pass. Mirrors 64, 66 and 68 are 4 meter radius-of-curvature total reflectors, having better than 99% reflectivity over a 2 to 7 micron band pass.

The laser cavity gain is the greatest for the fundamental transitions with the gain decreasing with increasing overtone transitions. This is shown graphically in FIG. 5 for a rotational temperature of 40° K. While strong fundamental laser output power completely spoils the overtone gain, strong overtone lasing does not completely spoil the fundamental gain. Thus, the farthest upstream laser cavity is reserved for second overtone lasing, the next downstream cavity for first overtone lasing and the final downstream cavity for fundamental lasing. With this ordering from lowest gain to highest gain the wavelength range of the laser extends from approximately 1.7$\mu$ to 5.8$\mu$ with many lines within the range.

EXAMPLE

Gas Mixture, by volume: CO/He/O$_2$, 78/921/1
Cavity Pressure: 2.75 Torr
Cavity Temperature: ~40° K.
Cavity Mach Number: 4.2.

With the flow conditions as given above and a device similar to that described above (Reference 1), quite powerful cw lasing on the CO first overtone bands in the 2.7 to 3.1 micron region was obtained. The experimental device had provision for only one optical cavity. The mirrors for this cavity consisted of a dielectric-coated flat providing approximately 1.0% transmission and 99% reflectivity over a 2.6 to 3.1 micron band pass and a peak reflectivity of 30% in the 4.8 to 5.8 micron band pass. At the conditions of the Example, 88 watts cw lasing power were measured. Of this output 20 watts were on the first overtone band; the remaining power came from some of the highest gain transitions in the fundamental, which still lased despite the low reflectivity of the cavity in the fundamental wavelength region. Input electrical power was 3.28 kW, giving an electrical efficiency for the first overtone lasing of 0.6%. FIGS. 3 and 4 show typical output spectra for the fundamental and overtone, respectively, and the observed lines are identified in Tables I and II.

TABLE I

CO Overtone, $\Delta V = 2$, Laser LInes, P(J)

| Measured Wavelength, μm | Calculated(Ref. 2) Wavelength, μm | V'-V" | J |
|---|---|---|---|
| 2.6896 | 2.6886 | 12–10 | 5 |
| 2.6920 | 2.6914 | | 6 |
| 2.7272 | 2.7262 | 13–11 | 5 |
| 2.7296 | 2.7290 | | 6 |
| 2.7324 | 2.7319 | | 7 |
| 2.7660 | 2.7647 | 14–12 | 5 |
| 2.7684 | 2.7676 | | 6 |
| 2.7716 | 2.7705 | | 7 |
| 2.8052 | 2.8042 | 15–13 | 5 |
| 2.8080 | 2.8071 | | 6 |
| 2.8108 | 2.8101 | | 7 |
| 2.8456 | 2.8446 | 16–14 | 5 |
| 2.8484 | 2.8476 | | 6 |
| 2.8516 | 2.8507 | | 7 |
| 2.8900 | 2.8892 | 17–15 | 6 |
| 2.8932 | 2.8923 | | 7 |
| 2.9296 | 2.9288 | 18–16 | 5 |
| 2.9324 | 2.9319 | | 6 |
| 2.9360 | 2.9351 | | 7 |
| 2.9732 | 2.9725 | 19–17 | 5 |
| 2.9764 | 2.9757 | | 6 |
| 2.9796 | 2.9789 | | 7 |
| 3.0180 | 3.0174 | 20–18 | 5 |
| 3.0212 | 3.0206 | | 6 |
| 3.0676 | 3.0668 | 21–19 | 6 |

TABLE II

CO Fundamental, $\Delta V = 1$, Laser Lines, P(J)

| Measured Wavelength, μm | Calculated(Ref. 2) Wavelength, μm | V'-V" | J |
|---|---|---|---|
| 4.888 | 4.8900 | 4–3 | 5 |
| 4.897 | 4.8994 | | 6 |
| 4.952 | 4.9532 | 5–4 | 5 |
| 4.961 | 4.9628 | | 6 |
| 5.016 | 5.0179 | 6–5 | 5 |
| 5.026 | 5.0276 | | 6 |
| 5.082 | 5.0842 | 7–6 | 5 |
| 5.092 | 5.0940 | | 6 |
| 5.149 | 5.1520 | 8–7 | 5 |
| 5.159 | 5.1620 | | 6 |
| 5.218 | 5.2214 | 9–8 | 5 |
| 5.229 | 5.2316 | | 6 |
| 5.289 | 5.2925 | 10–9 | 5 |
| 5.300 | 5.3029 | | 6 |
| 5.362 | 5.3653 | 11–10 | 5 |
| 5.384 | 5.3866 | | 7 |

It can be seen that the output on the fundamental is distributed over 16 lines on vibrational band components V=4→3 to V=11→10. The most intense band component is V=7→6; intensities decrease toward both higher and lower vibrational band components. Output on the overtone is measured on 25 lines, ranging in wavelength from the P(5) line of the V=12→10 band component at 2.688 μm to the P(6) line of V=21→19 at 3.066 μm. The lowest wavelength, the V=12→10 component, is the most powerful of the overtone band components; intensities per overtone component decrease almost linearly with increasing vibrational level, until at the V=21→19 band intensity is only ~1% of the V=12→10 intensity. Thus, the system lases on the fundamental from vibrational levels V=4 to V=11, and on the overtone from levels V=12 to V=21.

The present strong overtone lasing is partially a consequence of the very low kinetic temperature of the laser medium; the estimated in-cavity translational-rotational temperature is 40° K. For this temperature as shown in FIG. 5, kinetic modeling calculations indicate small signal optical gains of as high as 0.002 cm$^{-1}$ on the overtone and 0.05 cm$^{-1}$ on the fundamental. Accordingly, it is relatively easy to obtain laser oscillation on the overtone, since gains are of the order of 4% per cavity pass in the present device. A reasonable output coupling can be used, while still maintaining an in-cavity intensity of greater than 3 kW/cm$^2$. This results in a powerful cw infrared laser in the 3 μm region. In addition, gains of the order of 0.05 cm$^{-1}$ allow some lines on the fundamental to lase despite the low 5μ cavity reflectivity. For the second overtone small signal optical gains are as high as $6.5 \times 10^{-5}$ cm$^{-1}$. Although more difficult, kinetic modeling calculations indicate that it should be possible to obtain second overtone lasing with the appropriate laser cavity conditions. Specifically, lower cavity temperatures and a heavier molecular weight diluent (i.e., Ar in place of He) than those quoted in the example will increase second overtone gain above those values shown in FIG. 5.

In all work conducted to date, powerful lasing on an overtone transition, V→V−2, only occurs when lasing on the corresponding higher gain fundamental transitions V→V−1 is inhibited. It remains to be determined, however, if this result is generally true for various gas medium conditions and mirror reflectivities. In this connection, it should be noted that in work by Sadie, et al, (Reference 3) overtone lasing was reported for a chemical CO laser. In this work, both first overtone and fundamental transitions originating from the same vibrational level were lasing simultaneously. The power on the overtone transitions, however, was of the order of 1% of the power on the corresponding fundamental band component.

Finally, the relative intensities of the overtone laser spectrum of FIGS. 3 and 4 suggest a marked influence of laser-induced cascade. Calculations indicate that the lowest vibrational-level overtone transition, V=12→10, is not that having the highest small-signal gain. The fact, that, despite this, overtone output intensity monotonically increases with decreasing vibrational level number indicates a strong influence of cascading.

Although a preferred embodiment of the present invention has been illustrated and described, other changes will occur to those skilled in the art. It is therefore intended that the scope of the present invention is to be limited only by the scope of the appended claims.

REFERENCES

1. J. W. Rich, R. C. Bergman, and J. A. Lordi, AIAA J. 13, 95 (1975).
2. W. B. Roh and K. N. Rao, J. Molecular Spectroscopy 49, 317 (1974).
3. F. G. Sadie, P. A. Buger, and O. G. Malan, J. Appl. Phys. 43, 2906 (1972).

We claim:

1. A method for operating a laser on the vibrational fundamental and overtone infrared molecular bands including the steps of:
   supplying a mixture of gases including at least one lasant species to an electric discharge section;
   flowing said mixture of gases through said discharge section;
   vibrationally exciting said at least one lasant species through electron energy transfer in said electric discharge section;
   flowing said mixture of gases including said at least one vibrationally excited lasant species through a supersonic expansion to an optically resonant cavity to gas dynamically cool said mixture of gases to a chosen kinetic temperature; and
   serially extracting laser power from said cooled flowing mixture in the optically resonant cavity starting with the second overtone and progressing to the fundamental.

2. The method of claim 1 wherein said mixture of gases includes carbon monoxide and a diluent.

3. The method of claim 1 wherein the step of serially extracting laser power takes place in a constant temperature flow field.

4. A laser operating on fundamental and overtone vibration bands and including:
   discharge section means having an anode and a cathode and a fluid path there between;
   means for supplying a mixture of gases including at least one lasant species to said discharge section means;
   D.C. power supply means operatively connected to said anode and cathode;
   supersonic expansion section means located downstream of said discharge section means;
   laser power extraction means including an optically resonant cavity and located downstream of said supersonic expansion section means and serially including means for extracting first overtone vibrational band laser power and fundamental vibrational band laser power;
   whereby said at least one lasant species in said mixture of gases is vibrationally excited through electron energy transfer in said discharge section means and is then gas dynamically cooled to a chosen kinetic temperature in said supersonic expansion section means and first overtone vibrational band laser power and fundamental vibrational band laser power are serially extracted from a constant temperature flow field in said laser power extraction means.

5. The laser of claim 4 wherein said at least one lasant species is carbon monoxide.

6. The laser of claim 4 wherein said fluid path between said anode and cathode provides a smooth transition.

7. The laser of claim 4 wherein said means for extracting first overtone vibrational band laser power includes a first overtone band mirror pair one of which is a total reflector and one of which is a partial reflector.

8. The laser of claim 7 wherein said means for extracting fundamental vibrational band laser power includes a fundamental band mirror pair located downstream of said first overtone band mirror pair and including one total reflector mirror and one partial reflector mirror.

9. The laser of claim 8 further including means for extracting second overtone vibrational band laser power located upstream of said means for extracting first overtone vibrational band laser power.

10. The laser of claim 9 wherein said means for extracting second overtone vibrational band laser power includes a second overtone band mirror pair one of which is a total reflector and one of which is a partial reflector.

11. The laser of claim 7 further including means for extracting second overtone vibrational band laser power located upstream of said means for extracting first overtone vibrational band laser power.

12. The laser of claim 11 wherein said means for extracting second overtone vibrational band laser power includes a second overtone band mirror pair one of which is a total reflector and one of which is a partial reflector.

13. A method for operating a laser on the vibrational fundamental and overtone infrared molecular bands including the steps of:
   supplying a mixture of gases including at least one lasant species to an electric discharge section;
   flowing said mixture of gases through said discharge section;
   vibrationally exciting said at least one lasant species through electron energy transfer in said electric discharge section;
   flowing said mixture of gases including said at least one vibrationally excited lasant species through a supersonic expansion to an optically resonant cavity to gas dynamically cool said mixture of gases to a chosen kinetic temperature; and
   extracting laser power from said flowing mixture in the optically resonant cavity on the fundamental and at least one overtone.

14. A laser operating on fundamental and overtone vibration bands and including:
   discharge section means having an anode and a cathode and a fluid path there between;
   means for supplying a mixture of gases including at least one lasant species to said discharge section means;
   D.C. power supply means operatively connected to said anode and cathode;
   supersonic expansion section means located downstream of said discharge section means;
   laser power extraction means located downstream of said supersonic expansion section means and including at least one pair of mirrors defining an optically resonant cavity and whose reflectivity varies with wavelength;
   whereby said at least one lasant species in said mixture of gases is vibrationally excited through electron energy transfer in said discharge section means and is then gas dynamically cooled to a chosen kinetic temperature in said supersonic expansion section means and first overtone vibrational band laser power and fundamental vibrational band laser power are extracted from a constant temperature flow field in said laser power extraction means.

15. The laser of claim 14 wherein said laser power extraction means includes a single optical cavity and the reflectivity of said at least one pair of mirrors is chosen to create laser oscillation simultaneously on the fundamental and at least one overtone within said single optical cavity.

* * * * *